(12) United States Patent
Poppe et al.

(10) Patent No.: US 9,544,067 B2
(45) Date of Patent: Jan. 10, 2017

(54) METHOD AND SYSTEM FOR TRANSMITTING INFORMATION USING ULTRASONIC MESSAGES

(71) Applicant: Verizon Patent and Licensing Inc., Basking Ridge, NJ (US)

(72) Inventors: Theodore G. Poppe, Quincy, MA (US); Bryce Michael Schadl, Ashland, MA (US); Zhong Chen, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 371 days.

(21) Appl. No.: 14/192,194

(22) Filed: Feb. 27, 2014

(65) Prior Publication Data

US 2015/0244472 A1     Aug. 27, 2015

(51) Int. Cl.
*H04B 1/06* (2006.01)
*H04B 11/00* (2006.01)
*H04B 10/00* (2013.01)

(52) U.S. Cl.
CPC .............. *H04B 11/00* (2013.01); *H04B 10/00* (2013.01)

(58) Field of Classification Search
CPC ................................ H04B 10/00; H04B 11/00
USPC .......................................................... 367/135
See application file for complete search history.

(56) References Cited

U.S. PATENT DOCUMENTS

| | | | |
|---|---|---|---|
| 2011/0029370 A1* | 2/2011 | Roeding | G06Q 30/00 705/14.38 |
| 2011/0033061 A1* | 2/2011 | Sakurada | G10H 1/0058 381/81 |

* cited by examiner

*Primary Examiner* — Mark Hellner

(57) ABSTRACT

A device includes an audio capture device for receiving an audio signal in an ultrasonic frequency range. The device includes a processor to determine whether the received audio signal corresponds to an ultrasonic message. The processor extracts a content of the ultrasonic message, when it is determined that the received audio signal corresponds to an ultrasonic message, automatically handles the ultrasonic message based on the extracted content, stores at least a portion of the content of the ultrasonic message, and displays the portion of the content of the ultrasonic message to a user of the mobile device at a time subsequent to a time of the receipt of the audio signal.

20 Claims, 6 Drawing Sheets

| | MESSAGE TYPE | APPLICATION | DAYS ACTIVE | TIME ACTIVE | ACTIVATE APP |
|---|---|---|---|---|---|
| 505-1 | 1287 | | ALL | ALL | NO |
| 505-2 | 1425 | USA | ALL | 1800-2400 | YES |
| 505-3 | 1230 | ABC | 1, 7 | 1800-2400 | YES |
| 505-4 | 7815 | HARRIS TEETER | 2-6 | ALL | YES |
| 505-5 | 9873 | SEARS | ALL | ALL | YES |
| 505-5 | 5752 | XBOX | 1, 7 | ALL | NO |
| ... | ... | ... | ... | ... | ... |
| 505-N | 1131 | HUFFPOST.COM | ALL | ALL | NO |

FIG. 5

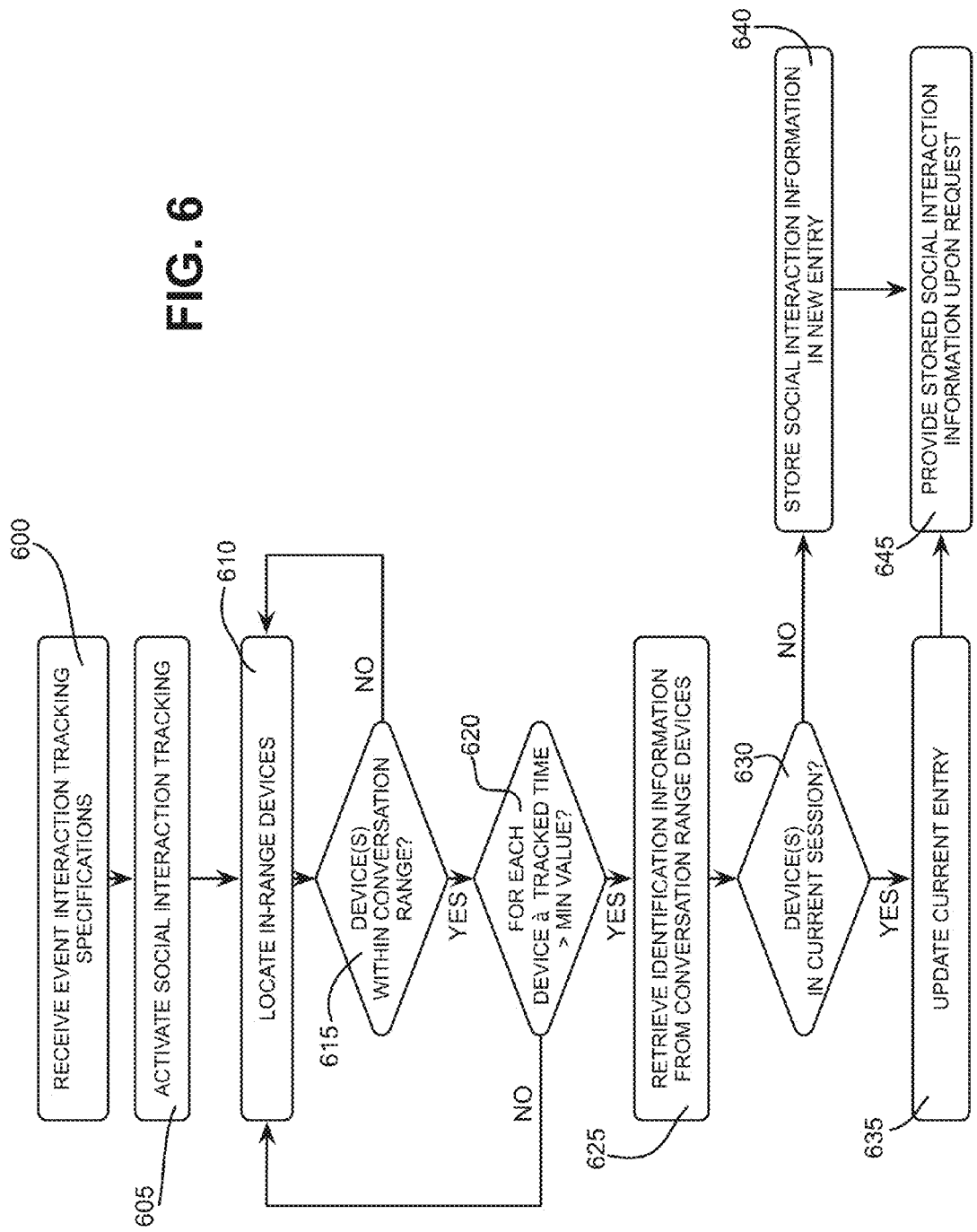

METHOD AND SYSTEM FOR TRANSMITTING INFORMATION USING ULTRASONIC MESSAGES

BACKGROUND

As mobile consumer electronic devices, such as mobile phones, tablet computers, personal digital assistants (PDAs), portable gaming devices, etc., have become increasingly ubiquitous, the public's general reliance on these devices for storing and managing events and details in their lives has also risen. Unfortunately, despite the large number of services, features, and applications now available on such devices, usage is often limited by the difficulty in accessing or activating the service, feature, or application. In some instances, it has been determined that adding a single user action (e.g., a click, button press, swipe, etc.) to a process required to access a feature or perform a function, decreases usage of the feature by up to 50%.

BRIEF DESCRIPTION OF THE DRAWINGS

FIG. 5 is a diagram illustrating a structure of an exemplary database for storing message handling rules consistent with embodiments described herein; and FIG. 6 is a flow diagram illustrating exemplary processing associated with receiving and handling ultrasonic messages in system of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Implementations described herein relate to a device, method, and system for facilitating an exchange of information between devices via ultrasonic audio signals, that is signals transmitted at frequencies higher than human beings are capable of hearing. In some implementations, a mobile telephone or other portable electronics device may include a microphone or other audio capture device for receiving ultrasonic messages. In some embodiments the ultrasonic messages may be output via a speaker associated with the device, while in other embodiments, the ultrasonic messages may be received from sources outside of the device, such as a radio, a television, a computer speaker, a public address (PA) system, etc. Logic associated with the device may be configured to extract and store information included within the received ultrasonic messages. In some embodiments, the information within the ultrasonic messages may include identification information associated with the originating source, such as advertiser information. In other embodiments, the information within the ultrasonic messages may include additional or auxiliary content associated with the originating source, such as loyalty rewards, coupons, Internet links, etc.

Figure 1:
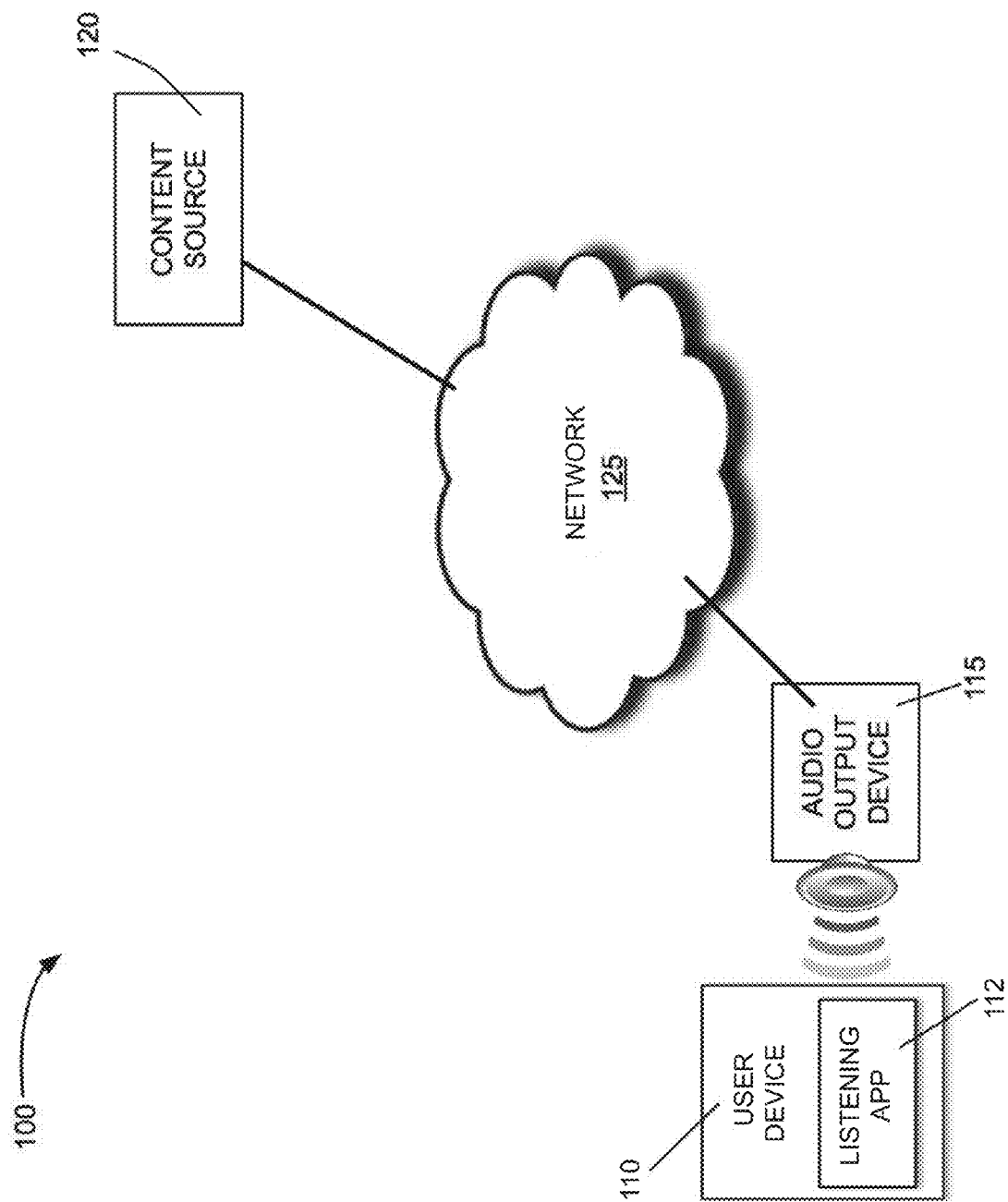
FIG. 1 illustrates an exemplary system in which systems and methods described herein may be implemented.

FIG. 1 is a block diagram of an exemplary system 100 in which systems and methods described herein may be implemented. System 100 may include a user device 110, an audio output device 115, a content source 120, and a network 125. User device 110 may include a mobile telephone, smartphone, tablet computer, personal digital assistant (PDA), or other suitable electronic communications device capable of interacting with other devices in the manner set forth below. For example, user device 110 may include a gaming device, global positioning system (GPS)-capable device, or other portable device. In alternative implementations, user device 110 may include a personal computer (PC), laptop computer, remote control device and/or any other appliance that may include an audio capture device and other applications for providing data processing and data communication functionality.

As described herein, user device 110 may include an application or logic to recognize messages received via ultrasonic audio and act upon the messages in a manner consistent with the content of the message. For example, as shown in FIG. 1, user device 110 may include a ultrasonic listening application 112 provided as a stand-alone application or integrated into the operating system of user device 110 or another application executing on user device 110. Ultrasonic listening application 112 may "listen" for ultrasonic messages either continually or when activated by a user. As used herein, the term "listen" refers to ultrasonic listening application 112 receiving ultrasonic messages, via the audio capture device, and interpreting or recognizing the content of the ultrasonic messages. As described herein the content of the ultrasonic messages may take any of a variety of formats, such as a modulated digital signal, ultrasonic voice signals, etc. In some embodiments, ultrasonic listening application 112 may operate in a low-power always listening (LPAL) mode designed to reduce the impact of continual audio monitoring. Such a low-power mode may be configured to capture audio in only a specific, narrow, frequency range associated with ultrasonic audio (e.g., between 20 kHz and 10 MHz) or utilizing a power-sensitive components (e.g., digital signal processor) of user device 110.

In some embodiments, as described below, ultrasonic listening application 112 may be configured to communicate the content of the recognized ultrasonic messages to other applications or devices. For example, in an implementation in which an ultrasonic message includes loyalty points or other loyalty information (e.g., a time marker indicating a time the user is listening, watching, in location, etc.) ultrasonic listening application 112 may transmit the loyalty information to an application or external entity associated with the loyalty program, such as a retailer, a media entity, etc.

Audio output device 115 may include any device configured to receive and output audio signals. Exemplary audio output devices 115 may include an amplitude modulation (AM) and/or frequency modulation (FM) radio, a television, a computer, another user device 110, etc. In some alternative embodiments, audio output device 115 may include devices configured to output only ultrasonic audio, such as advertising media (e.g., signs, billboards, etc.).

Content source 120 may include any entity configured to provide content that includes ultrasonic audio to audio output device 115. For example, content source 120 may include a traditional broadcast source, such as a radio station or television station, or may include other content sources, such as a web server associated with a web site, a streaming media server, an application server, etc.

Network 125 may include one or more wired, wireless and/or optical networks that are capable of receiving and transmitting data, voice and/or video signals, including multimedia signals that include voice, data and video information. Network 125 may include any communication network capable of transmitting information from content source 120 to audio output device 115, such as a wireless radio frequency (RF) broadcast network (e.g., AM/FM radio, broadcast television, cable/satellite television), as well as one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical system may include more or fewer devices than illustrated in FIG. 1. For example, other devices that facilitate communications between the various entities illustrated in FIG. 1 may also be included in system 100. In addition, user device 110 and audio output device 115 are each shown as separate elements. In other instances, the functions described as being performed by two or more user devices may be performed by a single user device. In other implementations, the functions described as being performed by one user device may be performed by another user device or by multiple user devices.

Figure 2:
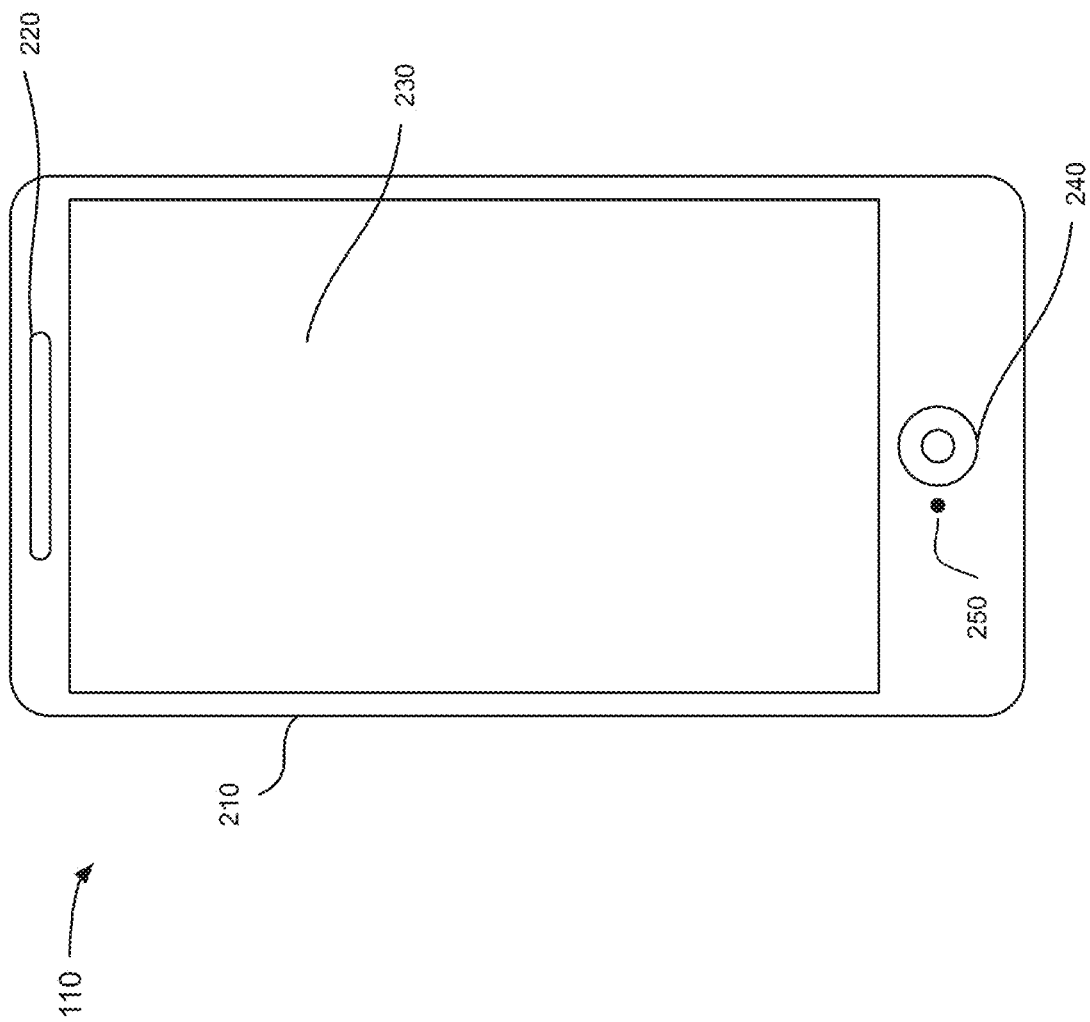
FIG. 2 is a diagram of an exemplary user device of FIG. 1.

FIG. 2 is a diagram of an exemplary user device 110 in which methods and systems described herein may be implemented. Referring to FIG. 2, user device 110 may include housing 210, speaker 220, display 230, control button 240, and microphone 250. Housing 210 may protect the components of user device 110 from outside elements. Speaker 220 may provide audible information to a user of user device 110. For example, speaker 220 may provide ringtones, beeping sounds or other sounds to alert the user to an event. Further, in some embodiments speaker 220 may also output ultrasonic sounds for receipt by microphone 250 and handling in the manner described herein.

Display 230 may provide visual information to the user. For example, display 230 may include a liquid crystal display (LCD), a touch screen display or another type of display used to provide information to a user, such as provide information regarding incoming or outgoing telephone calls and/or incoming or outgoing electronic mail (email), instant messages (e.g., mobile instant messages (MIMs), short message service (SMS) messages, multimedia message service (MMS) messages, etc. Display 230 may also display information or receive user instructions regarding various applications, such ultrasonic listening application 112.

Control button(s) 240 may provide an additional means with which the user may interact with user device 110 to cause user device 110 to perform one or more operations. For example, control button(s) 240 may include a home button, a back button, a search button, etc.

Microphone 250 may receive audible information from the user. As described briefly above, microphone 250 may include any audio capture device capable of receiving audio signals in the ultrasonic range.

Figure 3:
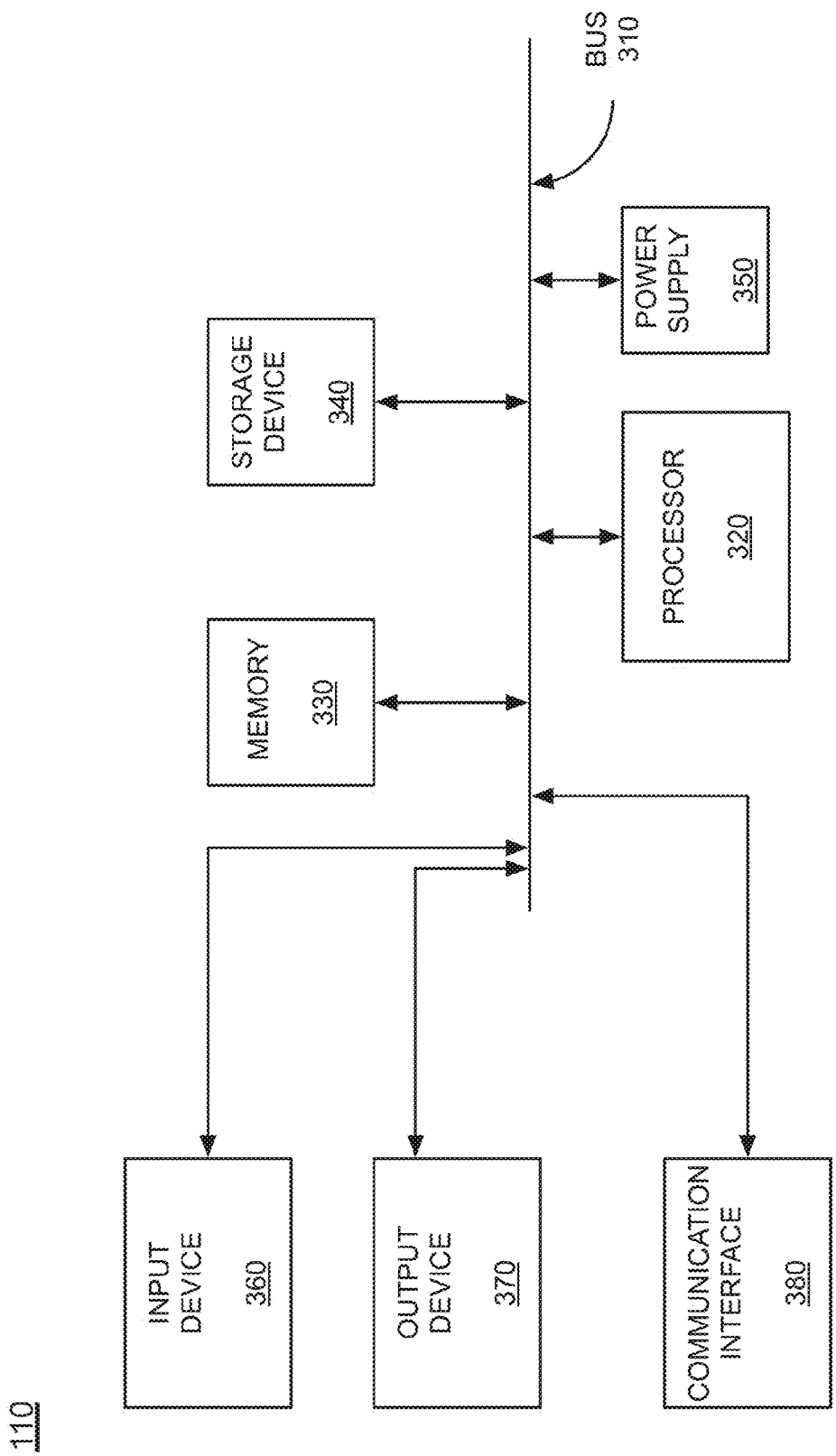
FIG. 3 is a diagram illustrating exemplary components of the user device of FIG. 2.

FIG. 3 is a diagram illustrating components of user device 110 according to an exemplary implementation. In some implementations, audio output device 115 may be configured in a similar manner. Referring to FIG. 3, user device 110 may include bus 310, processor 320, memory 330, storage device 340, power supply 350, input device 360, output devices 370, and communication interface 380. Bus 310 may include a path that permits communication among the elements of user device 110. It should be understood that user device 110 may be configured in a number of other ways and may include other or different elements. For example, user device 110 may include one or more modulators, demodulators, encoders, decoders, etc., for processing data.

Processor 320 may include one or more processors, microprocessors, application specific integrated circuits (ASICs), field programmable gate arrays (FPGAs), or other processing logic that may interpret and execute instructions. Memory 330 may include a random access memory (RAM) or another type of dynamic or static (e.g., read only memory (ROM)) storage device that may store information and instructions for execution by processor 320. In some implementations, as discussed briefly above, processor 320 may include a digital signal processor (DSP) distinct from a main processor of the device and capable of operating in a low-power always listening mode.

Storage device 340 may include a magnetic and/or optical recording medium and its corresponding drive. Power supply 350 may include a battery or other power source used to power user device 110.

Input device 360 may include one or more mechanisms that permit a user to input information to user device 110, such as a control keys 240, microphone 250, a touch screen, such as display 230, a mouse, a pen, voice recognition and/or biometric mechanisms, etc.

Output device 370 may include one or more mechanisms that output information to the user, including a display, such as display 230, a printer, one or more speakers, such as speaker 220, a vibrating mechanism that provides haptic feedback to a user, etc.

Communication interface 380 may include a transceiver that enables user device 110 to communicate with other devices and/or systems. For example, communication interface 380 may include mechanisms for communicating via network 125, such as a wireless network. In these implementations, communication interface 380 may include one or more radio frequency (RF) transmitters, receivers and/or transceivers and one or more antennas for transmitting and receiving RF data via a network. Communication interface 380 may also include an infrared (IR) transmitter and receiver and/or transceiver that enable user device 110 to communicate with other devices via infrared (IR) signals. Communication interface 380 may also include a modem or an Ethernet interface to a LAN or other network for communicating with other devices in system 100. In yet other implementations, communication interface 380 may be configured to include one or more short-range wireless technologies, such as radio frequency identifiers (RFID), Bluetooth®, or near field communication (NFC). Such technologies may provide for the exchange of data between devices in close physical proximity to each other in either an active or passive manner. Communication interface 380 may include other mechanisms for communicating with other devices 110 or via network 125.

In some implementations consistent with embodiments described herein, user device 110 may provide a platform for enabling a user to make and receive telephone calls, browse the Internet, send and receive electronic mail, text messages, instant messages (IMs), mobile IMs (MIMs), short message service (SMS) messages, take pictures or videos, etc., and execute various other applications. User device 110, as described in detail below, may also perform processing associated with identifying and handling ultrasonic messages (e.g., received from audio output device 115). User device 110 may perform these operations in response to processor 320 executing sequences of instructions contained in a computer-readable medium, such as memory 330. A computer-readable medium may be defined as a physical or logical memory device. The software instructions may be read into memory 330 from another computer-readable medium, such as data storage device 340, or from another device via communication interface 380. The software instructions contained in memory 330 may cause processor 320 to perform processes that will be described later. Alternatively, hard-wired circuitry may be used in place of or in combination with software instructions to implement processes consistent with the embodiments described herein. Thus, implementations described herein are not limited to any specific combination of hardware circuitry and software.

Figure 4:
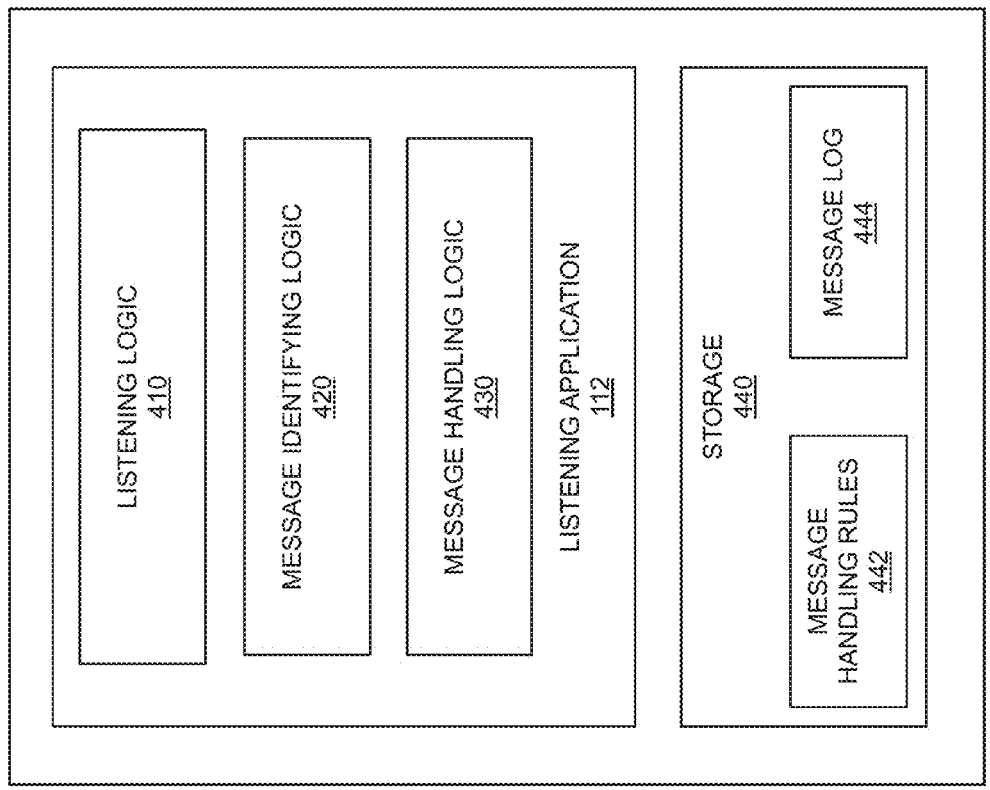
FIG. 4 is an exemplary functional block diagram of components implemented in the user device of FIG. 1.

FIG. 4 is an exemplary functional block diagram of components implemented in user device 110 of FIG. 2, such as by processor 320 executing ultrasonic listening application 112 stored in memory 330. The functional blocks illustrated in FIG. 4 may be implemented in software, hardware, or a combination of hardware and software, such as a combination of a low power digital signal processor, a main processor, an operating system, and software associated with ultrasonic listening application 112. For the purpose of simplicity, the following description will be made with respect to user device 110.

Referring to FIG. 4, memory 330 may include ultrasonic listening application 112 executable by processor 320. As will be discussed in detail below, operation of ultrasonic listening application 112 enables user device 110 to monitor and receive ultrasonic messages (also referred to as "ultrasonic audio signals"), identify the content of the ultrasonic messages, and perform a variety of actions based on the identified content. As illustrated, ultrasonic listening application 112 may include or may connect to listening logic 410, message identifying logic 420, message handling logic 430, and storage 440. Ultrasonic listening application 112 and its various associated logic components are shown in FIG. 4 as being included in user device 110. In alternative implementations, these components or a portion of these components may be located externally with respect to user device 110. For example, in some implementations, one or more of the components of ultrasonic listening application 112 may be located in or executed by a remote network device (e.g., an application server, etc.). In such an implementation, user device 110 may provide information or access to the remote network device to facilitate identification and handling of received ultrasonic messages via ultrasonic listening application 112. A user of user device 110 may subsequently view or retrieve ultrasonic message related information from the remote network device.

Listening logic 410 may monitor or acoustically "listen" for ultrasonic messages received by microphone 250 of user device 110. Consistent with embodiments described herein, listening logic 410 may activate microphone 250 and receive audio in at least an ultrasonic frequency ranges (e.g., audio above 20 kHz). Listening logic 410 may include an always listening mode, in which microphone 250 continually captures or samples audio (e.g., at predetermined or periodic sampling intervals) and passes the audio to processor 320, such as a dedicated or discrete digital sound processor (DSP). In other embodiments, listening logic 410 may be affirmatively activated by a user command, such as via a keypad command, a voice command, interaction with a user interface of ultrasonic listening application 112, etc.

Message identifying logic 420 may examine or analyze the audio signals received by microphone 250 and passed from listening logic 410. For example, message identifying logic 420 may be configured to demodulate a modulated ultrasonic signal (e.g., a frequency shift keyed eying (FSK) modulated signal output by audio output device 115) to generate data corresponding to the ultrasonic message, the data corresponding to the content of the message. In other embodiments, message identifying logic 420 may be configured to perform voice/speech or pattern recognition on the ultrasonic message to identify the content of the ultrasonic message. That is, message identifying logic 420 may perform such voice or pattern recognition on audio signals in the ultrasonic range (i.e., above 20 kHz).

In one implementation, listening logic 410 or message identifying logic 420 may include filtering logic (e.g., a bandpass filter) for limiting or restricting a range of audio signals analyzed for the presence of ultrasonic messages. For example, such filtering logic may be configured to pass only audio signals above 20 kHz for additional processing/handling. Such filtering may further reduce power requirements, by ensuring that only high frequency signals are subjected to identification analysis. In other implementations, message identifying logic 420 may include additional noise cancellation and/or error correction logic to ensure and/or verify that the ultrasonic messages are accurately received and recognized.

As described herein, storage 440 may include a portion of storage device 340 configured to receive and maintain information or data relating to ultrasonic listening application 112. As shown in FIG. 4, storage 440 may include message handling rules 442 and message log 444.

Message handling logic 430, upon identification of an ultrasonic message by message identifying logic 420, performs functions based message handling rules 442 retrieved from storage 440. As described herein, message handling rules 442 may direct the handling of received ultrasonic messages based on the type and/or content of the message received and, optionally, user-configured message handling rules. For example, in an embodiment in which ultrasonic listening application 112 is configured to maintain a log or repository of identified ultrasonic messages, message handling logic 430 may, based on a corresponding rule in message handling rules 422, extract or generate text (and/or other media) corresponding to the identified message and store the text (and/or other media) in message log 444. Consistent with implementations described herein, ultrasonic listening application 112 may facilitate review and management of the messages stored in message log 444. For example, users of ultrasonic listening application 112 may be able to sort, search, or delete messages, as well as forward messages to other users, applications, or social media platforms. In other embodiments, additional message handling rules 442 may be used for handling received ultrasonic messages. In still other implementations, message handling logic 430 may be configured to ignore multiple identical messages received within a predetermined period of time (e.g., 30 seconds, etc.) to avoid redundant messages being stored or handled.

FIG. 5 illustrates a structure of an exemplary database corresponding to message handling rules 442 in storage 440. Referring to FIG. 5, database 500 may include a number of handling rule entries 505-1 to 505-N (collectively "rules 505" or individually "rule 505"). Each rule 505 may include a message type identifier field 510, an application field 515, a days active field 520, a time active field 525, and an activate application field 530.

For each rule 505, message type identifier field may include an identifier used to identify the one or more rules 505 that are to be used by message handling logic 430 to handle or process the identified message. For example, each message received and identified by message identifying logic 420 may include, among other elements, an identified message type identifier (e.g., as a value at a known location in a received bit stream, etc.). Message handling logic 430 may then search database 500 based on the message type identifier in the received message. Although exemplary message type identifier fields in database 500 are discloses as numerical, any type of identifier may be used.

Application field 515 may store an identifier (or memory pointer) associated with an application (if any) to which content data in a corresponding message is to be sent. This field is optional for each rule 505; however, when an application identifier (also referred to as a destination identifier) is included in a matching rule; it indicates an application or other destination (e.g., remote network location, such as an Internet site, etc.) to which content data from the receive message is forwarded. For example, as shown in FIG. 5, rule 505-2 may include an application identifier of USA network (or a corresponding alphanumeric identifier).

Days active field 520 may optionally include an indication of which days of the week, the rule is to be applied. For example, as shown in FIG. 5, days active field 520 in rule 505-3 includes the numbers 1, 7, which indicates that rule 505-3 is applied only on Saturdays and Sundays. Similarly, time active field 525 may optionally include an indication of which times of the day, the rule is to be applied. For example, as shown in FIG. 5, time active field in rule 505-3 includes the numbers 1800-2400 which indicates that rule 505-3 is applied only between the hours of 6:00 PM and 11:00 PM. Time limitations may be desirable, based on the type of message that is being handled. For example, where a message type relates to television content which may output ultrasonic messages relating to second screen content, advertisement recording, etc. it may be desirable to limit the receipt and handling of such messages to periods of time in which the user is likely to be watching television. In some embodiments, it may be necessary or advantageous to standardize times in relation to, for example, Greenwich Mean Time (GTM). Further, for rules configured to apply to all days and times, fields 530 and 525 may be blank or may include a default or universal value, such as ALL, or an appropriate alphanumeric code.

Activate application field 530 may include a binary value indicative of whether receipt of a message matching the rule causes the application identified in field 515 to become active on user device 110. For example, a value of YES in field 530 may cause message handling logic 430 to launch, open, or otherwise display the application identified in field 515, while a value of NO in field 530 may cause message handling application 430 to handle the received message in a manner which does not directly affect a display of user device 110. By way of example, rule 505-2 incudes a YES value in field 530. Upon receipt of a ultrasonic message matching the message type identifier of rule 505-2, message handling logic 430 may forward the content of the received message to the USA Networks application (identified in field 515 of rule 505-2) and, based on the YES value in field 530, may also trigger or cause the USA Networks application to become activated. Depending on a configuration of the USA Networks application, the application may provide content, interfaces, etc. (e.g., second screen content) corresponding to the content of the received ultrasonic message.

As another example, rule 505-1 incudes a NO value in field 530. Upon receipt of a ultrasonic message matching the message type identifier of rule 505-1, message handling logic 430 may forward the content of the received message to the message log 444 (identified in field 515 of rule 505-1) for storage of the content of the message. Based on the NO value in field 530 of rule 505-1 the contents of message log 444 are not displayed upon receipt of the message, rather the content of any messages matching this type are merely stored for later retrieval or browsing by the user.

Consistent with embodiments described herein, rules 505 in database 500 may be entered/configured in a variety of manners. For example, users of listening application 112 may manually configure ultrasonic listening application 112 (or settings corresponding to listening application 112) to handle different types of ultrasonic message in different ways that correspond to the different rules. In other instances, other applications, such as those identified in fields 515 may instruct ultrasonic listening application 112 to enter one or more message handling rules, upon authorization by a user of user device 110. For example, a shopping application may cause one or more shopping-related message handling rules to be entered in database 500 for use by message handling logic 430 to handle shopping-related ultrasonic messages.

FIG. 6 is a flow diagram illustrating an exemplary process 600 associated with receiving and handling ultrasonic messages. In one implementation, process 600 may be performed by user device 110 in combination with audio output device 115 and content source 120. In other implementations, process 600 may be performed by one or more other devices of system 100, such as other user devices 110 or network 125.

Processing may begin with user device 110 listening or otherwise monitoring for ultrasonic messages (block 605). For example, as described above with respect to FIG. 4, listening logic 410 may be configured to sample received via microphone 250 or another suitable audio capture device. In some embodiments, listening logic 410 may continually, or persistently monitor for audio content, while in other embodiments, audio capture may be manually or affirmatively initiated by a user, such as via a user action.

At block 610, user device 110 receives an audio signal and at block 615, user device 110 determines whether the received audio signal comprises an ultrasonic audio signal. In some implementations, user device 110 (e.g., listening logic 410 or message identifying logic 420) may include one or more filters (e.g., a bandpass filter) for filtering audio content and limiting message identification processing to only audio signals in the ultrasonic (i.e., above approximately 20 kHz) frequency range. If the received audio signal does not include an ultrasonic audio signal (block 615—NO), process 600 returns to block 610 for the next sampling interval.

If the received audio signal includes an ultrasonic audio signal (block 615-YES), user device 110 determines whether the ultrasonic audio signal includes an identifiable ultrasonic message and extracts or determining the content of the ultrasonic message (block 620). For example, message identifying logic 420 may be configured to examine or analyze the ultrasonic audio signals received by microphone 250 and passed from listening logic 410 by, for example, demodulating the received signal, performing voice or pattern recognition, etc. In one implementation, the content of the ultrasonic message includes at least a message type identifier and data corresponding to the message being transmitted. In other embodiments, messages that do not include message type identifier are subjected to a default message handling rule, such as storing the data content, date, and time of the message receipt in message log 444. If an ultrasonic message is not identified (block 620—NO), process 600 again returns to block 610 for the next sampling interval.

Upon receipt and recognition of the ultrasonic message (block 620—YES), user device 110 handles the message in a manner consistent with message handling rules associated with listening application 112 (block 625). For example, as described above in relation to FIGS. 4 and 5, a number of message handling rules 505 may be stored in database 500. Upon recognition of an ultrasonic message having a message type identifier, message handling logic 430 searches message handling rules database 500 for one or more matching message handling rules. If a matching rule is identified, message handling logic 430 handles the received ultrasonic message based on the content of the matching rule(s). As described above, if the recognized ultrasonic message does not include a defined message type identifier or includes a message type identifier that is not matched to a message handling rule 505, message handling logic 430 may be configured to store the data content for the message in message log 444 for later review by the user.

As described herein, a variety of different types of audio output devices 115, message types, and handling rules are enabled consistent with embodiments described herein. In one exemplary embodiment, audio output device 115 comprises a car stereo having an AM/FM/HD radio. In this embodiment, the radio broadcast output by the radio is adapted to include ultrasonic messages corresponding to advertisements presented in the radio broadcast. Ultrasonic listening application 112 running on user device 110 is then be configured to listen for the ultrasonic messages output by the car stereo. Upon receipt of a particular ultrasonic message corresponding to an advertisement, ultrasonic listening application recognizes the content of the ultrasonic message (e.g., the advertiser's name, contact information, Internet link, coupon or offer details, etc.) and stores (e.g., in storage 440) the content of the ultrasonic message for later review by the user of user device 110.

In another implementation, audio output device 115 includes a television or home theater (e.g., including a set top box, stereo receiver, speakers, sound bar, etc.) for receiving audio/video content from either broadcast or a media service provide (e.g., cable company, satellite television company, etc.). Consistent with this embodiment, at least some portions of the audio content output by the television or home theater are configured to include ultrasonic messages corresponding to or relating to the output video content. For example, a programmed episodic television show may include ultrasonic messages that trigger the launching of a "second screen" application relating to the show. In some implementations, the ultrasonic messages may be used to synchronize the content of the second screen application to the output television show. In these implementations, a message handling rule 505 in database 500 may be created to direct handling of the ultrasonic messages relating to the show. In additional embodiments, ultrasonic messages corresponding to advertisements displayed in the video content may be handled in a manner similar to that described above with respect to car audio content (e.g., cataloging and storing the message content in log 444 for later review/management).

In still another implementation, ultrasonic messages may be used to indicate attendance or visit/activity duration for the purposes of providing rewards or other usage/time based incentives. For example, assume that a user visits a website, such as Huffington Post.com or AOL.com, although a particular computer or device on which the user visits the content may be track a duration (e.g., via cookies, session trackers, etc.), the user may not be "credited" with the time spent on the site unless they are logged into the site. In addition, visits across different platforms may not be aggregated in any manner.

Consistent with embodiments described herein, a website or application may cause intermittent ultrasonic messages that identify both the site/platform/application being visited or used as well as the time at which the ultrasonic message is output. Upon receipt of these messages, ultrasonic listening application 112, or an application/network location associated with the tracked site or application, may identify durations of time that the users are accessing or using the website or application. Based on this information, the site or application may identify rewards or other incentives that the user qualifies for.

As an example, assume that the user plays a game on a video game system, and also plays a related game on their computer or mobile device. Ultrasonic messages output by the video game system, the computer game, and the mobile game indicative of the time spent playing the games are collected and forwarded to the game developer for use in providing rewards (such as in-game purchase credit, special bonuses, etc.). Although the audio output device 115 for the ultrasonic messages differ, the message type identifier for the messages may be common across all devices, allowing the messages to be handled in a common fashion.

In yet another embodiment, ultrasonic messages may be used to provide location based advertisements or coupons to retail shoppers. In this embodiment, audio output device 115 includes a relatively low-power (or low volume) speaker positioned in a location proximate to a product or products relating to the advertisement/coupon related to the ultrasonic message. For example, the speaker device outputting the ultrasonic messages may be positioned on or under a shelf on which the product is positioned. As the user of user device 110 approaches the location of the product, ultrasonic listening application 112 captures the audio corresponding to the advertisement or coupon, recognizes the message, and handles the message based on a suitable handling rule 505. For example, ultrasonic listening application 112 may be configured to output a pop-up notification about a coupon for the product, activate a shopping application and present the coupon/advertisement, etc.

Implementations described herein relate to a devices, methods, and systems for transmitting information via ultrasonic messages. In some implementations, a mobile telephone or other portable electronics device may include one or more components for capturing, recognizing, and handling messages embodied within ultrasonic audio signals. Logic associated with the device may be configured to store the content of the received messages or forward data corresponding the messages to other applications/components for further handling or processing.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to a mobile or portable device configured to performing ultrasonic message receipt and handling. In other implementations, features described herein may be implemented mainly in one or more devices remote from the mobile or portable device. For example, the mobile device may be configured to transmit information relating to any detected ultrasonic messages to a remote ultrasonic message handling device. Further, while series of acts have been described with respect to FIG. 6, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
   an audio capture device for receiving an audio signal in an ultrasonic frequency range;
   a storage; and
   a processor to:
      determine whether the received audio signal corresponds to an ultrasonic message;
      extract a content of the ultrasonic message, when it is determined that the received audio signal corresponds to an ultrasonic message,
      wherein the content of the ultrasonic message comprises at least a message type identifier and message data;
      automatically handle the ultrasonic message based on the extracted content;
      store at least a portion of the content of the ultrasonic message in the storage; and
      display the portion of the content of the ultrasonic message to a user of the device at a time subsequent to a time of the receipt of the audio signal,
      wherein the processor to automatically handle the ultrasonic message is further to:
         maintain a plurality of ultrasonic message handling rules, each ultrasonic message handling rule having a message type identifier and a destination identifier;
         search the plurality of ultrasonic message handling rules based on the message type identifier in the ultrasonic message to identify a matching ultrasonic message handling rule; and
         forward the message data of the ultrasonic message to a destination identified by the destination identifier in the matching ultrasonic message handling rule.

2. The device of claim 1, wherein the device comprises:
   a portable electronic device comprising at least the audio capture device, the storage, a display, and the processor.

3. The device of claim 2, wherein the device further comprises a filter to filter out audio signals that are not in the ultrasonic frequency range.

4. The device of claim 2, wherein the processor comprises a low-power always listening, digital signal processor.

5. The device of claim 1, wherein the processor to determine whether the received audio signals correspond to an ultrasonic message is further configured to:
   determine whether the received audio signals have a frequency greater than 20 kilohertz.

6. The device of claim 1, wherein the processor to determine whether the received audio signals correspond to an ultrasonic message is further configured to:
   determine whether the received audio signals exhibit a predetermined audio pattern.

7. The device of claim 1, wherein the processor to extract the content from the ultrasonic message is further configured to:
   demodulate the ultrasonic audio signal to generate the ultrasonic message content.

8. The device of claim 1, wherein the processor to extract the content from the ultrasonic message is further configured to:
   perform voice or speech recognition on the ultrasonic message to identify the content of the ultrasonic message.

9. The device of claim 1, wherein the processor to store and display the portion of the content of the ultrasonic message is further configured to:
   display the stored portion of the content of the ultrasonic message to the user upon request;
   delete the stored portion of the content of the ultrasonic message upon request by the user; and
   forward the stored portion of the content of the ultrasonic message upon request by the user.

10. The device of claim 1, wherein the content of the ultrasonic message comprises one or more of advertisement content, coupon content, tracking content, or content related to contemporaneous audio/video content discernible by a user of the device.

11. The device of claim 1, wherein the content of the ultrasonic message comprises a network link or multimedia information.

12. The device of claim 1, wherein the destination identified by the destination identifier identifies at least one of an application executing on the device or a network location remote from the device.

13. A computing device-implemented method, comprising:
- capturing, by a mobile device, an audio signal from an audio output device;
- determining, by the mobile device, whether the captured audio signal corresponds to an ultrasonic message in an ultrasonic frequency range;
- extracting, by the mobile device, a content of the ultrasonic message, when it is determined that the captured audio signal correspond to an ultrasonic message,
- wherein the content of the ultrasonic message comprises at least a message type identifier and message data;
- automatically handling, by the mobile device, the ultrasonic message based on the extracted content;
- storing, by the mobile device, at least a portion of the content of the ultrasonic message; and
- displaying, by the mobile device, the portion of the content of the ultrasonic message to a user of the mobile device at a time subsequent to a time of the capture of the audio signal,
- wherein the automatically handling the ultrasonic message further comprises:
  - maintaining a plurality of ultrasonic message handling rules, each ultrasonic message handling rule having a message type identifier and a destination identifier;
  - searching the plurality of ultrasonic message handling rules based on the message type identifier in the ultrasonic message to identify a matching ultrasonic message handling rule; and
  - forwarding the message data of the ultrasonic message to a destination identified by the destination identifier in the matching ultrasonic message handling rule.

14. The computing device-implemented method of claim 13, wherein the capturing the audio signal is performed without an explicit command by the user of the mobile device.

15. The computing device-implemented method of claim 13, wherein determining whether the captured audio signal correspond to an ultrasonic message in an ultrasonic frequency range comprises:
- filtering out audio signals that are not in the ultrasonic frequency range; or
- determining whether the captured audio signal has a frequency greater than 20 kilohertz or whether the captured audio signal exhibit a predetermined audio pattern.

16. The computing device-implemented method of claim 13, wherein extracting the content from the ultrasonic message further comprises:
- demodulating the ultrasonic audio signal to generate the ultrasonic message content; or
- performing voice or speech recognition on the ultrasonic message to identify the content of the ultrasonic message.

17. The computing device-implemented method of claim 13, wherein the destination comprises at least one of an application stored on the mobile device or a network location remote from the mobile device.

18. A computer-readable medium having stored thereon sequences of instructions which, when executed by at least one processor, cause the at least one processor to:
- capture an audio signal via an audio capture device;
- determine whether the captured audio signal corresponds to an ultrasonic message in an ultrasonic frequency range;
- extract a content of the ultrasonic message, when it is determined that the captured audio signal correspond to an ultrasonic message,
- wherein the content of the ultrasonic message comprises at least a message type identifier and message data;
- automatically handle the ultrasonic message based on the extracted content;
- store at least a portion of the content of the ultrasonic message; and
- display the portion of the content of the ultrasonic message to a user at a time subsequent to a time of the capture of the audio signal,
- wherein the sequences of instructions which, when executed by at least one processor, cause the at least one processor to automatically handle the ultrasonic message further comprise instructions to:
  - maintain a plurality of ultrasonic message handling rules, each ultrasonic message handling rule having a message type identifier and a destination identifier;
  - search the plurality of ultrasonic message handling rules based on the message type identifier in the ultrasonic message to identify a matching ultrasonic message handling rule; and
  - forward the message data of the ultrasonic message to a destination identified by the destination identifier in the matching ultrasonic message handling rule.

19. The computer-readable medium of claim 18, wherein the sequences of instructions which, when executed by at least one processor, cause the at least one processor to store and display the portion of the content of the ultrasonic message further comprise instructions to:
- display the stored portion of the content of the ultrasonic message to the user upon request;
- search the stored portion of the content of the ultrasonic message;
- delete the stored portion of the content of the ultrasonic message upon request by the user; and
- forward the stored portion of the content of the ultrasonic message upon request by the user.

20. The computer-readable medium of claim 18, wherein the destination comprises at least one of an application stored on a mobile device that includes the at least one processor or a network location remote from the mobile device.

* * * * *